Aug. 20, 1946.     A. J. HORNFECK     2,406,221

MEASURING SYSTEM

Filed May 31, 1945     2 Sheets—Sheet 1

Addition

Subtraction

*INVENTOR.*
ANTHONY J. HORNFECK
BY
*ATTORNEY*

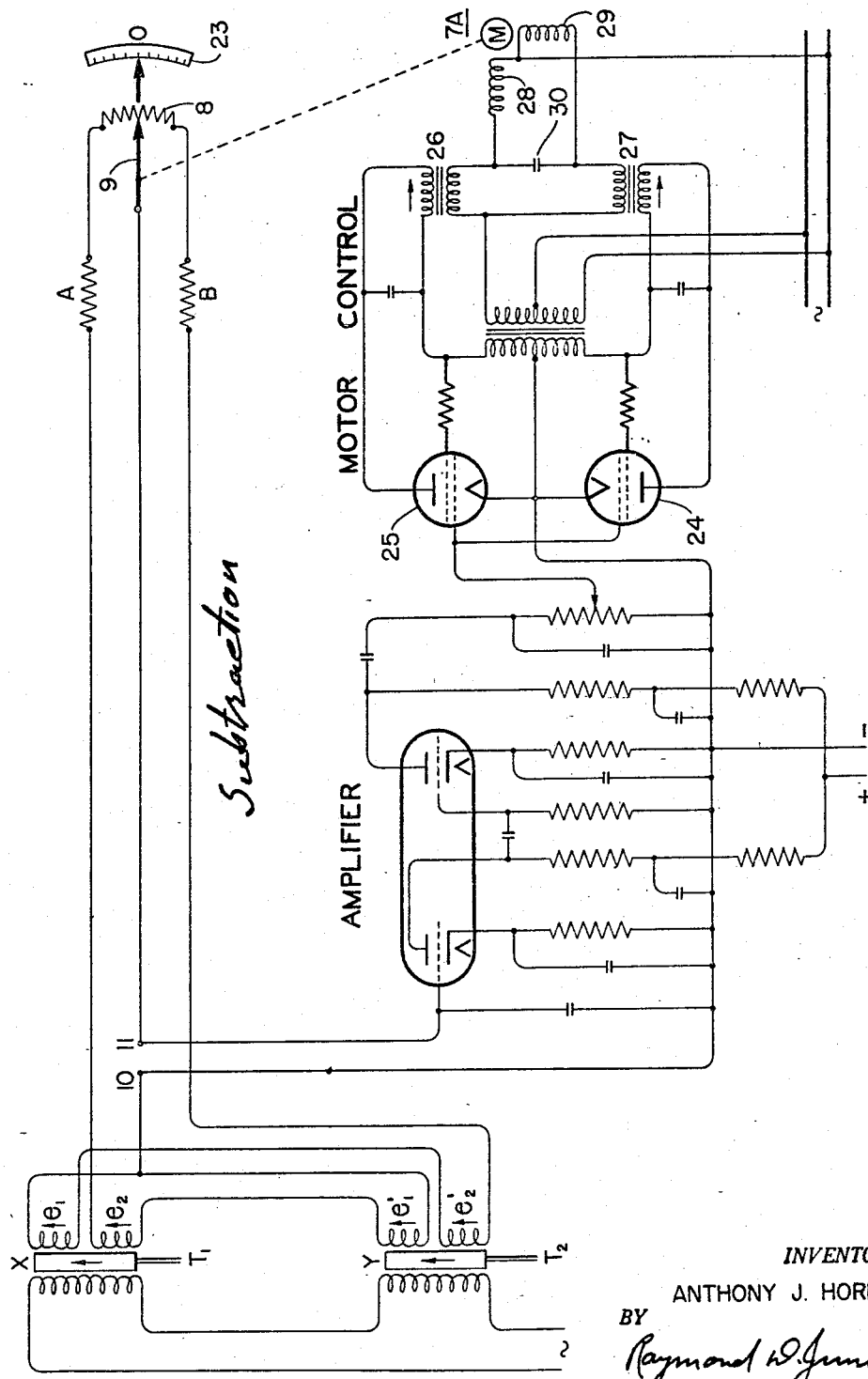

Patented Aug. 20, 1946

2,406,221

UNITED STATES PATENT OFFICE 2,406,221

MEASURING SYSTEM

Anthony J. Hornfeck, Cleveland Heights, Ohio, assignor to Bailey Meter Company, a corporation of Delaware Application May 31, 1945, Serial No. 596,909

12 Claims. (Cl. 177—351)

This invention relates to telemetric control systems for producing an electrical effect in accordance with the difference between a plurality of variables. The effect may, for example, control suitable means for maintaining a dependent variable in correspondence with a master or independent variable. The variables may be the same or different. One of the variables, for example the independent variable, may be rate of flow of a fluid, humidity, temperature, pressure, electromotive force, or the like, while another of the variables, for example the dependent variable, may be the position of a member. In other cases the independent variable may be the position of a member, and the dependent variable may be the rate of flow, humidity, temperature, pressure, electromotive force, or the like.

In accordance with my invention the magnetic coupling between a primary and a secondary coil or coils is varied in correspondence with one of the variables so that voltages produced in a secondary circuit may correspond in magnitude to the magnitude of one of the variables. The secondary circuit comprises a bridge or balanceable electric network, a certain portion of which is adjusted by and in accordance with the other variable to rebalance the bridge after the bridge has been unbalanced by a change in the magnetic coupling between the primary and secondary windings mentioned. If the variables are equal or stand in predetermined proportion, the voltages in the bridge are equal or balanced. If proper correspondence does not exist between the variables, then an unbalance of voltage will exist in the bridge, which voltage will have a phase depending upon the sense of departure of the independent variable from proper correspondence with the dependent variable. The phase of the voltage determines the direction of operation of suitable electromagnetic means which may or may not be arranged to alter the value of one of the variables to maintain the same in proper correspondence with another of the variables. More particularly, one or the other of a pair of electron discharge devices is rendered conducting selectively in accordance with the phase of the voltage or potential between the portions of the network, and the electron discharge devices in turn control the starting, stopping and direction of movement of suitable electromagnetic means, such for example as a motor.

This application constitutes a continuation-in-part of my copending application, Serial No. 453,489, filed August 3, 1942, and entitled Measuring and controlling systems. My present invention is directed particularly to the continuous interrelation of the instantaneous values of a plurality of variable conditions, quantities, positions, or the like, to the end that a receiving mechanism continuously evaluates the desired interrelation.

Specifically, the interrelation here contemplated is one of algebraic summation of two or more variables where the result may comprise an addition or a subtraction of the instantaneous value of the variables.

As a preferred embodiment of my present invention I provide a balanceable electrical network including a plurality of transmitting units each under the control of a variable and also include in the network a receiving unit arranged to continuously provide the desired interrelation of the instantaneous values to which the transmitters are sensitive.

In the drawings:

Fig. 4 is a more complete circuit diagram useful in subtracting two variables.

Figure 1:
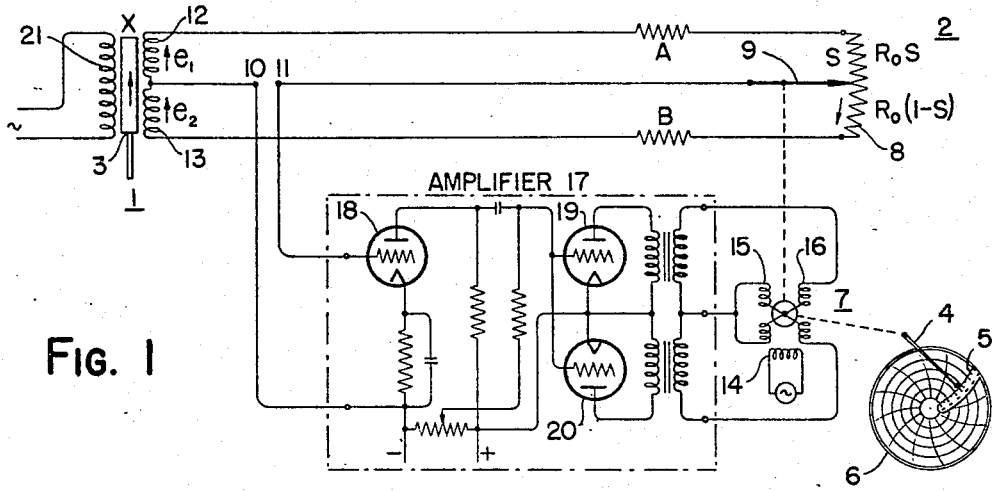
Fig. 1 is substantially a duplicate of Fig. 2 of my copending application, Serial No. 453,489, of which the present application is a continuation-in-part.

As a specific embodiment I have illustrated in Fig. 1 my invention as adapted to telemeter the magnitude of a variable from a remote or transmitting station to a local or receiving station. It is evident that in this embodiment the variable, or the position of the transmitting member positioned in accordance therewith, may be considered as the independent variable and the position of the exhibiting or receiving member as the dependent variable. Lack of correspondence between the independent and dependent variable unbalances a voltage condition which through suitable relay means acts to vary the magnitude of the dependent variable until proper correspondence with the independent variable is restored.

I provide at the transmitting station magnetically coupled primary and secondary coils or windings comprising a movable core transformer. At the receiver station is an adjustable resistance or potentiometer. The transmitter secondary winding and the receiver potentiometer are included in a bridge or balanceable network, The magnetic coupling between the transmitter primary and secondary windings varies in accordance with changes in the independent variable, and hence the voltage induced in the transmitter secondary winding or windings will be proportional to the magnitude of the independent variable. The proportioning of the receiver potentiometer resistance between certain portions of the bridge circuit is varied in correspondence with changes in the dependent variable. In the present embodiment being described it is the position of the exhibiting means, and hence the voltage relation in the receiver resistance will be proportional to the magnitude of the dependent variable.

If the position of the exhibiting means properly corresponds to the then existing value of the variable being transmitted, the voltages in the arms of the bridge are equal or in proper proportion and the bridge is in balance. If such correspondence does not exist, then the voltages will not be equal or in proper proportion and an unbalance of the bridge will exist. Furthermore, a voltage will exist across certain points of the bridge between the receiver and the transmitter, and which voltage will be of one phase if the lack of correspondence is in one sence and of opposite phase if the lack of correspondence is in the opposite sense. As, for example, the arrangement may be such that upon an increase in the value of the variable a proportionate increase in the voltage in one transmitter secondary winding will result and a decrease in the other transmitter secondary winding, so that the output voltage of the bridge circuit between the transmitter and he receiver will be of one phase, and upon a decrease in the value of the variable a proportionate opposite change in the voltage across the bridge will result, so that the voltage between the transmitter and receiver will be of opposite phase. The phase of this voltage causes selective operation of suitable electromagnetic means for altering the position of the exhibiting means and to restore the same to proper correspondence with the variable.

Referring now to Fig. 1, I therein illustrate my invention as having a transmitting station 1 and a receiving station 2. The core piece 3 of the transmitter is shown diagrammatically as positionable by any variable, such for example as fluid rate of flow, temperature, pressure, or merely with the position of an object, such as a gun or searchlight. The system is arranged to telemetrically transmit the position of the core piece 3 to a receiver location 2 which may be adjacent or remote from the location of the member 3. Preferably the value of the variable, as represented by the position of the core piece 3, is continuously indicated by a marker 4 relative to an index scale 5 and a rotatable chart 6. The member 4 is positioned by a motor 7 illustrated as a shaded pole alternating current motor.

The arrangement comprises a mutual inductor potentiometer bridge circuit wherein the transmitter 1 employs a three-coil mutual inductor and the receiver 2 employs a potentiometer or resistance winding 8 divided into two portions by a movable contact arm 9, which is positioned by the motor 7 for rebalancing the bridge circuit.

If equal potentials exist at the terminals 10 and 11 then the position of the core piece 3 may be said to correspond with that of the contact arm 9. However, a change in position of the core piece 3 will, if in one direction, cause a voltage of one phase to exist between the terminals 10 and 11 and of the opposite phase if the core piece 3 changes in position in opposite direction. Such voltage existing between the terminals 10 and 11 is, through suitable amplifying and relay means, used to selectively operate the motor 7 in one direction or the other in accordance with the phase of the voltage. As shown, the motor 7 is employed both to position the index 4 and to position the balancing contact arm 9. The direction of operation of the motor 7 is such that the contact arm 9 is moved towards correspondence with the position of the core 3, and when such correspondence is obtained the potential at the terminals 10 and 11 will again be equal or balanced.

Assume, for example, that at some value of the variable being transmitted the voltage induced in the secondary winding 12 is equal to that induced in the secondary winding 13. Then upon an increase in the value of the variable from the assumed value the voltage induced in the winding 12 will be greater than that induced in the winding 13. This will cause a voltage of predetermined phase to exist between the terminals 10 and 11. Assuming on the other hand, a decrease in the variable from the assumed value a voltage of opposite phase will exist between the terminals 10 and 11. Under the first condition the motor 7 is caused to operate in direction to move the contact 9 to vary the proportioning of the resistance 8 until the voltage induced in the winding 13 is again equal to that induced in the winding 12. Under the second condition the motor 7 is caused to operate in opposite direction until the voltage induced in the windings 12 and 13 is again equal. The position of the motor 7 and any of the elements positioned thereby thus becomes a measure of the variable which is physically positioning the core piece 3.

The motor 7 is shown as being of the type having a field winding 14 energized from a suitable source of alternating current and having opposed shading pole windings 15 and 16. When the windings 15 and 16 are open circuited or are both effectively short-circuited the motor 7 remains stationary. When the pole winding 15 is effectively energized, as by being short circuited, the motor 7 will rotate in one direction, and when the winding 16 is effectively energized, as by being short circuited, the motor 7 will rotate in opposite direction. In order that a voltage of one phase between the terminals 10 and 11 will cause, for example, effective short circuiting of the pole winding 15 and a voltage of reverse phase will cause effective short-circuiting of the winding 16, I employ an amplifying and control circuit 17 forming the subject matter of Patent 2,275,317 to John D. Ryder.

The voltage existing across the terminals 10 and 11 is first amplified by means of an electron discharge device 18. The amplitude of the pulsations in the output circuit of the device 18 will depend upon the difference in potential of the terminals 10 and 11, and the phase of the pulsations will depend upon whether the potential at the terminal 10 is greater or lesser than that at the terminal 11.

The output of the device 18 is utilized to selectively control the current transmission through a pair of motor control tubes 19 and 20 which are inductively coupled to the motor windings 15 and 16.

When either the device 19 or 20 is rendered conducting, thereby effectively short circuiting the secondary of the related transformer, the impedance of the circuit of the pole winding 15 or 16 is sufficiently reduced to effect rotation of the motor 7 in one direction or the other. Such rotation, as heretofore described, positions the index 4 relative to the scale 5 and chart 6, and simultaneously positions the contact arm 9 relative to the resistance 8 to again bring the system to a null or balanced condition.

The transmitter 1 includes a primary winding 21 magnetically coupled by the core piece 3 to a pair of secondary windings 12, 13. The bridge circuit or balanceable electrical network includes the secondary windings 12, 13, the potentiometer resistance 8, fixed resistances A and B, as well as the amplifier 17 for controlling rotation of the motor 7. In this circuit S is a potentiometer of relatively high resistance $R_0$ (5000 ohms or more); the contact 9 of which is positioned by the reversing motor 7. A and B are fixed resistances for adjustment.

The condition for bridge balance is:

$$\frac{e_1}{e_2} = \frac{A + R_0 S}{B + R_0(1-S)} \qquad (1)$$

where $R_0$ = resistance of receiver potentiometer 8
$e_1$ and $e_2$ are functions of the position of core 3
$x$ is travel of core 3 from 0 to 1
$S$ is travel of contact 9 from 0 to 1

By restricting the motion of the core 3 and by proper design of the inductor these quantities $e_1$ and $e_2$ can be made to vary with $x$ in a straight line manner as follows:

$$e_1 = E_0 + \Delta e \; x \qquad (2)$$
$$e_2 = E_0 + \Delta e \; (1-x)$$

If $A = B = R_0 \frac{E_0}{\Delta e}$ in Equation 1 then $x = S$

The ratio $e_1/e_2$ is a function only of the position of the magnetic core 3 and is not affected by the magnitude, frequency or phase of the exciting voltage applied to the primary winding 21. The accuracy of positioning is practically independent of phase shift of the exciting voltage on the mutual inductor. For this reason ambient temperature changes of the windings 12, 13 and 21, as well as line resistance, have negligible effect on the balance of the receiver 2. However, the primary winding 21 must be supplied from the same electrical source and from the same phase (if a 3-phase system) as the motor winding 14.

It will be observed that the bridge including the windings 12 and 13, as well as resistances A, B, $R_0S$, and $R_0(1-S)$ is not a conventional bridge to which a source of power is directly applied. The power supply for the balanceable network is obtained through the magnetic coupling of core piece 3 between the primary winding 21 and the secondary windings 12, 13. The induced voltages have been represented as $e_1$ and $e_2$ and are functions of the position of core 3. In a steady state or balanced condition, the percentage of total movement $x$ being equal to the percentage of total movement $S$, there is an electrical balance established in the bridge and there is no voltage or current flow through the conjugate conductor between the terminals 10, 11.

If the position of the core 3 is changed (as by a change in the value of the variable represented by the position of the core 3) then the ratio $e_1/e_2$ is varied and a potential is established in the conjugate conductor across terminals 10, 11 whose magnitude is representative of the magnitude of the change in position of the core 3, while the phase of the potential in the conjugate conductors 10, 11 is representative of the sense of change in position of the core piece 3. In other words, if the core 3 were moved upwardly then the phase of the potential across 10, 11 would be in one direction, while if the core 3 were moved downwardly the phase of the potential across terminals 10, 11 would be of opposite sense.

The amplifier 17 is sensitive and responsive to the phase of the potential across terminals 10, 11 controlling rotation of the motor 7 in a direction corresponding to said phase. The motor 7 is mechanically or otherwise connected to position the contact arm 9 by the necessary gear or motion reduction which has been indicated in Fig. 1 merely diagrammatically as a dotted line. When the core 3 is moved in one direction, thereby changing the ratio $e_1/e_2$ in given sense, the resulting phase condition across terminals 10, 11 causes a positioning of the motor 7 and correspondingly of the contact arm 9 to vary the ratio $R_0S/R_0(1-S)$ in proper direction and amount to rebalance the bridge and bring the potential across the terminals 10, 11 to a null condition of both potential and phase. Thereupon the position of the contact arm 9 and of the indicating pointer 4 is representative of position of the core 3. In this manner the motor 7 indicates the value of the variable which has caused the positioning of the core 3 and at the same time returns the bridge to a null or steady state condition.

Figure 2:
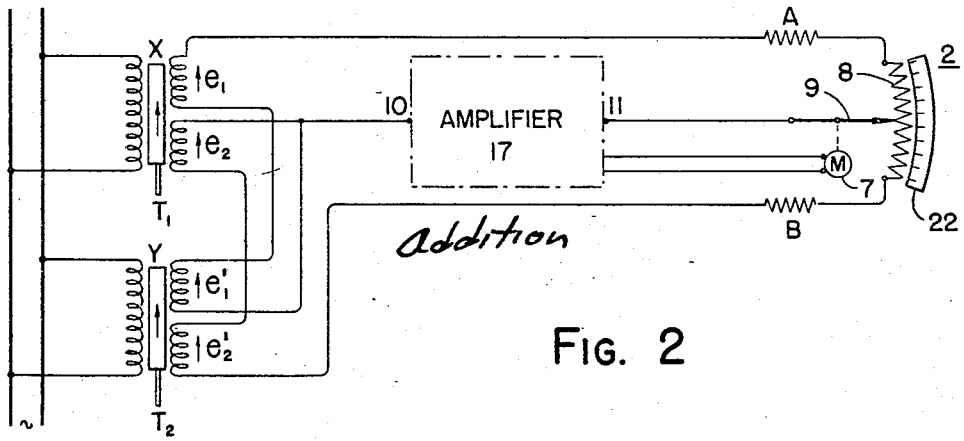
Fig. 2 is a schematic electrical diagram embodying the addition of two variables.

Fig. 2 is substantially a duplicate of Fig. 7 of my copending parent application previously mentioned. I show herein a single receiver 2 adapted to interrelate the values of a plurality of transmitters which may be remotely located relative to the receiver. Specifically the showing of Fig. 2 performs an addition of the variables represented by two transmitters. Thus the position of the contact arm 9 relative to an index 22 is the sum of the positions of the transmitters $T_1$ and $T_2$. The balance equation for this circuit is:

$$\frac{e_1 + e'_1}{e_2 + e'_2} = \frac{A + R_0 S}{B + R_0(1-S)} \qquad (3)$$

and $$\begin{aligned} e_1 &= E_0 + (\Delta e)x \\ e'_1 &= E_0 + (\Delta e)y \\ e_2 &= E_0 + (\Delta e)(1-x) \\ e'_2 &= E_0 + (\Delta e)(1-y) \end{aligned} \qquad (4)$$

Substituting in Equation 3 gives $$\frac{2E_0 + \Delta e(x+y)}{2E_0 + \Delta e(1-x-y)} = \frac{A + R_0 S}{B + R_0(1-S)} \qquad (5)$$

Letting $A = B = \frac{E_0}{\Delta e} R_0$ and solving for $S$ yields $S = x + y$ I have shown, superimposed upon the core of each of the transmitters in the various views of the drawings, an arrow indicating the direction of movement of the core relative the primary and secondary windings for an increase in the value of the variable which positions said core.

Figure 3:
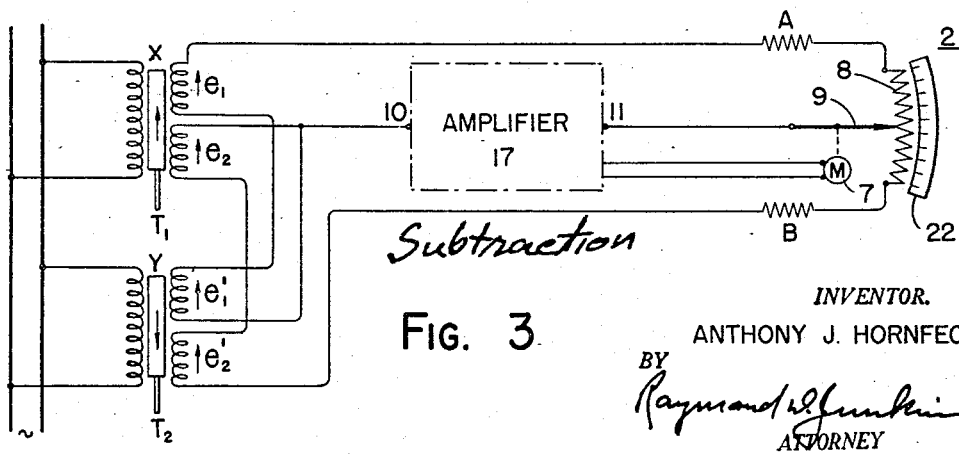
Fig. 3 is a schematic electrical diagram similar to Fig. 2 but useful in substracting the value of two variables.

In Fig. 3 I illustrate an adaptation of my invention specifically directed to performing a subtraction of the value of the two variables which are represented by the positions of the transmitter cores $T_1$ and $T_2$. Herein it will be observed that the motion arrow of transmitter core $T_1$ is opposite in direction to that of transmitter $T_2$. In other words, for an increase in one variable the transmitter core $T_1$ moves upwardly, whereas for an increase in value of the second variable the core $T_2$ is arranged to be moved downwardly. The windings of the primaries and secondaries are the same as in Fig. 2 and the secondaries are electrically connected into the balanceable bridge circuit in the same manner as in Fig. 2. However, the arrangement of Fig. 3 is such as to continuously subtract the position of the core $T_2$ from $T_1$ and in terms of motion $S = x - y$.

It will be observed that the arrangement of Fig. 3 has certain limitations. The movement $S$ of the contact arm 9 relative to the resistance 8 and to the indicating scale 22 is equal to $x - y$. Thus it is always necessary to know that the variable used in positioning the core $T_1$ is going to be greater in magnitude than the variable used in positioning the core $T_2$. Such a prediction is usually possible, however, for if one desires to subtract one fluid rate of flow from another, or one temperature from another, etc., one usually knows which variable will be the base from which the other variable is to be subtracted.

In certain instances it is desired to compare two variables in either direction from an equality or proportional relationship to continuously indicate whether the two variables are in equality, or whether one is greater or lesser than the other. Even in this event one of the variables is always compared to the other whether or not the one is greater, equal to, or less than the said other. By way of example I would refer to the proportioning of air supplied to the furnace of a vapor generator to the rate of discharge of vapor from the generator. The supply of air for combustion is representative of the heat input to the generator while the vapor outflow from the generator is representative of the heat outflow. If the heat inflow is not properly proportioned to the heat outflow, then there is inefficiency and wastage in the operation.

As a guide for operation of such a vapor generator is desirable indicator of steam flow-air flow relationship would have a center zero with the air flow always compared to the rate of steam outflow. If too much air for proper combustion is being supplied, then the air flow rate would be greater than the steam flow rate. If a deficiency of air for proper combustion is being supplied, then the rate of air flow would be less than the rate of steam outflow. Either of these conditions is to be avoided, and the desired relationship is one of unity, appreciating that in the actual construction of the mechanism the necessary motion reducing or amplifying mechanism would be inserted between the air flow meter and its core and similarly the proper mechanism between the steam flow meter and its transmitting core. Thus the mechanisms might be so designed and constructed that equal increments of air flow rate relative to increments of steam flow rate would position the transmitter cores $T_1$ and $T_2$ equally. On the other hand, combustion efficiency tests might show that a ratio of 1.2 air flow rate to 1 steam flow rate were the desideratum under all conditions of operation and such an interrelation would be incorporated in the linkage or mechanism whereby the transmitter cores $T_1$ and $T_2$ are respectively moved by the two rate of flow meters. After such basic design and constructional precautions are taken however, the desideratum would be equal movements of the transmitter cores $T_1$ and $T_2$ and an indication of unity relative to the visual index. Such an indication of unity would result in the subtraction of one core position or motion from that of the other equals zero.

From a condition of desired relationship between steam flow rate and air flow rate; the air flow rate may be too great or too small relative to the steam flow rate showing an excess or a deficiency respectively of air supplied for combustion. The usefulness of such a guide in the operation of a furnace is apparent. In accordance with my present invention the receiver pointer should continually show the result of subtracting steam flow and air flow rate and irrespective as to which is the greater at any instance. The pointer will in fact desirably go in one direction (indicating an excess of air) and in the other direction from the center zero (indicating a deficiency of air).

Referring now to Fig. 4, I show an arrangement for subtracting two variables in the manner just described wherein one variable is continuously compared with the other variable and indicated upon an index as being greater than, or less than, the base variable to which the other is compared.

Referring back to Figs. 2 and 3 it will be seen that the secondary windings therein are connected with $e_1$ and $e'_1$ in series, and with $e_2$ and $e'_2$ in series. In Fig. 4 the secondary windings of the transmitters $T_1$ and $T_2$ are connected in a different manner, namely, with $e_1$ and $e'_2$ in series, while $e_2$ and $e'_1$ are in series.

The condition for balance at center zero of the index is expressed by Equation 6 below:

$$\frac{e_1 + e'_2}{e_2 + e'_1} = \frac{A + R_0 S}{B + R_0(1 - S)} \qquad (6)$$

Letting $A = B = \frac{E_0}{\Delta e} R_0$ $$\frac{E_0 + \Delta e(x) + E_0 + \Delta e(1-y)}{E_0 + \Delta e(1-x) + E_0 + \Delta e(y)} = \frac{\frac{E_0}{\Delta e}R_0 + R_0 S}{\frac{E_0}{\Delta e}R_0 + R_0(1-S)}$$

$$\frac{x + 1 - y}{1 - x + y} = \frac{S}{1 - S}$$

$$S = \frac{1 + x - y}{2}$$

In Fig. 4 the conjugate terminals 10, 11 are joined to a phase sensitive amplifier selectively controlling electron discharge devices 24, 25. The output circuits of the devices 24, 25 are individually included in the circuits of saturating windings of saturable core reactors 26, 27 having alternating current output windings in a loop circuit including motor windings 28, 29 and a capacitor 30.

The capacitor-run motor 7A is of a type wherein rotation is obtained in one direction when current flow is directly through the winding 28 and simultaneously through the winding 29 in series with the capacitor 30. Rotation in the opposite direction is obtained when current flow is directly through the winding 29 and is simultaneously through the winding 28 in series with the capacitor 30. Desired directional rotation of the motor 7A is accomplished by preponderance of saturation in the saturating windings of reactors 26, 27. Whichever reactor predominates determines the direction of rotation of the motor, while the amount of predominance determines the speed of rotation.

The motor 7A is connected to position the contact arm 9 along the potentiometer resistance 8 in proper direction and amount to rebalance the circuit and stop the motor 7A. The position of the arm 9 is indicative of the position resultant of interrelation between the cores $T_1$ and $T_2$ and its position is further visual relative a center zero scale 23 which may be graduated to show the relative positions or values of the variables represented by $T_1$ and $T_2$. For example, if $T_1=T_2$ then the pointer 9 should indicate unity relation opposite the center zero of the scale 23. If $T_2$ is greater than $T_1$, or lesser than $T_1$, then the pointer 9 will move along the scale 23 in one direction or the other relative to the center zero, and obviously the scale 23 may be graduated to show the value of $x-y$ or of $y-x$ in proper units of value for the variables positioning the cores $T_1$ and $T_2$.

In general, the arrangements of Figs. 2, 3 and 4 illustrate the interrelation of a plurality of variables to arrive at a visual or otherwise useful manifestation of such interrelation which may be an algebraic summation of the variables, and specifically an addition or a subtraction of such values.

It will be understood that I have illustrated and described certain preferred embodiments of my invention and as examples only and not by way of limitation.

What I claim as new, and desire to secure by Letters Patent of the United States, is:

1. A telemetric system including in combination, a plurality of transmitters and a receiver, each transmitter including a primary and a pair of secondary windings and a core piece positioned responsive to a variable whose value is to be transmitted to the receiver, a common source of alternating current for the primary windings, a balanceable bridge circuit including in one arm one secondary of each transmitter, in the second arm the remaining secondaries of the transmitters and as the third and fourth arms a resistance proportioned by a movable contact and comprising the receiver, thermionic means included in a conjugate connection of the bridge and sensitive to bridge unbalance in either direction, and means actuated by the thermionic means to shift the receiver contact along the resistance until the bridge is balanced, said last mentioned means responding in rate of movement to the degree of bridge unbalance.

2. A telemetric system including in combination, a pair of transmitters and a receiver, each transmitter including a primary and a pair of secondary windings and a magnetic coupling means positioned responsive to a variable whose value is to be transmitted to the receiver, the coupling means of one of the transmitters positioned for an increase in its related variable in opposite sense to the positioning of the other coupling means for an increase in its related variable, a common source of alternating current for the primary windings, a balanceable electric bridge network including in one arm one secondary of each transmitter, in the second arm the remaining secondaries of the transmitters and as the third and fourth arms a resistance proportioned by a movable contact and comprising the receiver, thermionic means included in a conjugate connection of the bridge and sensitive to network unbalance in either direction, and a motor actuated by the thermionic means to shift the receiver contact along the resistance until the network is balanced, the relative position of the contact along the resistance being indicative of the difference in value of the two variables.

3. A telemetric system including in combination, a pair of transmitters and a receiver, each transmitter including a primary and a pair of secondary windings and a magnetic coupling means positioned responsive to a variable whose value is to be transmitted to the receiver, the coupling means of one of the transmitters positioned for an increase in its related variable in opposite sense to the positioning of the other coupling means for an increase in its related variable, a common source of alternating current for the primary windings, a balanceable electric bridge network including in one arm one secondary of each transmitter, in the second arm the remaining secondaries of the transmitters and as the third and fourth arms a resistance proportioned by a movable contact and comprising the receiver, and a motor sensitive to network unbalance selectively positioning the receiver contact along the resistance until the network is balanced, the relative position of the contact along the resistance being indicative of the difference in value of the two variables.

4. A telemetric system for continuously subtracting the values of two variables including in combination, a pair of transmitters and a receiver, each transmitter including a primary and two secondary windings, a source of alternating current for the primary windings, each of the secondary windings of each transmitter being connected in series with the corresponding winding of the other transmitter and into one arm of a balanceable electric network, said receiver having a resistance proportioned in said network by a movable contact, magnetic coupling means for each transmitter adapted to vary the voltage induced from the primary to the two secondary windings, the coupling means for one of the transmitters positioned for an increase in its related variable in opposite sense to the positioning of the other coupling means for an increase in its related variable, and amplifying means sensitive to unbalance of the network and adapted upon unbalance of the network by changes in any transmitter to shift the receiver contact along the resistance until the bridge is rebalanced, the position of the contact relative the resistance providing a manifestation of the difference in instantaneous value of the two variables.

5. The combination of claim 4 wherein the amplifying means includes a motor selectively movable in either of two directions and at a speed determined by the degree of network unbalance.

6. A telemetric system for providing an algebraic addition of values from a plurality of transmitters including in combination, a plurality of transmitters each including a primary and a pair of secondary windings, a source of alternating current for the primary windings, each secondary winding of each transmitter being connected in series with a secondary winding of each of the other transmitters and into one arm of a balanceable bridge circuit, a receiver totalizer having a resistance proportioned in said bridge by a movable contact, and thermionic means included in a conjugate conductor of said bridge sensitive to unbalance of said bridge and adapted upon unbalance of said bridge by changes in any transmitter to shift the receiver contact along the resistance until the bridge is balanced, the position of said contact being representative of the said algebraic sum.

7. A telemetric system for continuously subtracting the values from a plurality of transmitters each representative of the value of a variable including in combination, a plurality of transmitters each including a primary and a pair of secondary windings, a source of alternating current for the primary windings, each secondary winding of each transmitter being connected in series with a secondary winding of each of the other transmitters and into one arm of a balanceable bridge circuit, a receiver having a resistance proportioned in said bridge by a movable contact, and thermionic means included in a conjugate conductor of said bridge sensitive to unbalance of said bridge and adapted upon unbalance of said bridge by changes in any transmitter to shift the receiver contact along the resistance until the bridge is balanced, the position of said contact being representative of the difference in the values of the transmitters.

8. A telemetric system for continuously subtracting the values of two variables including in combination, a transmitter for each of the two variables and a single receiver, each transmitter including a primary and two secondary windings, a source of alternating current for the primary windings, one secondary winding of the one transmitter being connected in series with the non-corresponding secondary winding of the other transmitter and into one arm of a balanceable electric network, the remaining secondary winding of each of the two transmitters being connected in series in a second arm of said network, said receiver having a resistance proportioned in said network by a movable contact, magnetic coupling means for each transmitter adapted to vary the voltage induced from the primary to the two secondary windings, each coupling means arranged to be positioned in accordance with the value of one of the two variables and in the same sense relative the respective windings for an increase in the value of the variables, and amplifying means sensitive to unbalance of the network and adapted upon unbalance of the network by changes in any transmitter to shift the receiver contact along the resistance until the bridge is rebalanced, the position of the contact relative the resistance providing a manifestation of the difference in the value of the two variables.

9. The combination of claim 8 wherein the amplifying means includes a motor selectively movable in either of two directions and at a speed determined by the degree of network unbalance.

10. The combination of claim 8 including an indicating scale cooperative with said contact, said scale having a center zero whereby the contact indicates zero difference between the variables or the difference between the greater and the lesser variable regardless of which is the greater.

11. A telemetric totalizer including in combination, a plurality of transmitters and a receiver totalizer, each transmitter including a primary and a pair of secondary windings, a source of alternating current for the primary windings, each secondary winding of each transmitter being connected in series with the corresponding winding of the other transmitter and into one arm of a balanceable bridge circuit, said receiver having a resistance proportioned in said bridge by a movable contact, and amplifying means included in a conjugate connection of said bridge sensitive to unbalance of said bridge and adapted upon unbalance of said bridge by changes in any transmitter to shift the receiver contact along the resistance until the bridge is rebalanced.

12. A telemetric totalizer including in combination, a plurality of transmitters and a receiver totalizer, each transmitter including a primary and a pair of secondary windings and a core piece positioned responsive to a variable whose value is to be included in the total, a common source of alternating current for the primary windings, a balanceable bridge circuit including in one arm the corresponding secondaries of the transmitters, in the second arm the remaining secondaries of the transmitter and as the third and fourth arms a resistance proportioned by a movable contact and comprising the receiver, thermionic amplifying means included in a conjugate connection of the bridge and sensitive to bridge unbalance in either direction, and means actuated by said amplifier to shift the receiver contact along the resistance until the bridge is balanced, said last mentioned means responding in rate of movement to the degree of bridge unbalance.

ANTHONY J. HORNFECK.